United States Patent
Jungwirth et al.

(10) Patent No.: US 10,379,195 B2
(45) Date of Patent: Aug. 13, 2019

(54) RISLEY PRISM BASED STAR TRACKER AND CELESTIAL NAVIGATION SYSTEMS

(71) Applicant: Honeywell International Inc., Morris Plains, NJ (US)

(72) Inventors: Matthew Edward Lewis Jungwirth, Golden Valley, MN (US); Wesley J. Hawkinson, Chanhassen, MN (US); Sorin Mosor, Peoria, AZ (US)

(73) Assignee: Honeywell International Inc., Morris Plains, NJ (US)

(*) Notice: Subject to any disclaimer, the term of this patent is extended or adjusted under 35 U.S.C. 154(b) by 147 days.

(21) Appl. No.: 15/604,501

(22) Filed: May 24, 2017

(65) Prior Publication Data

US 2018/0341003 A1    Nov. 29, 2018

(51) Int. Cl.
| | |
|---|---|
| *G01C 9/00* | (2006.01) |
| *G02B 23/02* | (2006.01) |
| *G02B 5/04* | (2006.01) |
| *G01S 3/786* | (2006.01) |
| *G02B 26/08* | (2006.01) |
| *G01S 3/781* | (2006.01) |

(52) U.S. Cl.
CPC .......... *G01S 3/7867* (2013.01); *G01S 3/781* (2013.01); *G02B 5/04* (2013.01); *G02B 26/0891* (2013.01)

(58) Field of Classification Search
CPC ......... G01S 3/7867; G01S 3/781; G02B 5/04; G02B 26/0891
USPC ...................................................... 250/203.6
See application file for complete search history.

(56) References Cited

U.S. PATENT DOCUMENTS

| | | | |
|---|---|---|---|
| 6,343,767 B1 | 2/2002 | Sparrold et al. | |
| 7,898,712 B2 | 3/2011 | Adams et al. | |
| 8,049,886 B1 * | 11/2011 | Raksi | G01J 3/02 |
| | | | 356/326 |
| 8,400,700 B2 | 3/2013 | Adams et al. | |
| 9,644,920 B2 * | 5/2017 | Jahromi | F41G 1/38 |
| 2005/0195505 A1 | 9/2005 | Braun et al. | |
| 2011/0285981 A1 | 11/2011 | Justice et al. | |
| 2013/0044317 A1 | 2/2013 | Justice et al. | |

OTHER PUBLICATIONS

Lacoursiere et al., "Large-Deviation Achromatic Risley Prisms Pointing Systems", Optical Scanning 2002, Jun. 6, 2002, pp. 123-131, Publisher: Proc. SPIE vol. 4773.

Craig Schwarze, "A New Look At Risley Prisms", Photonics Spectra, Jun. 2006, pp. 1-5, Publisher: OPTRA, Inc.

* cited by examiner

*Primary Examiner* — Seung C Sohn
(74) *Attorney, Agent, or Firm* — Fogg & Powers LLC

(57) ABSTRACT

An optical system comprises a pair of Risley prisms positioned along an optical axis to receive a light beam from a field of view, wherein at least one of the Risley prisms is rotatable, transverse to the optical axis, with respect to the other of the Risley prisms. At least one lens is positioned along the optical axis to receive the light beam from the pair of Risley prisms, with the at least one lens configured to focus the light beam. An optical detector array is positioned along the optical axis at an image plane, wherein the optical detector array receives the focused light beam on the image plane from the at least one lens. The optical system can be implemented as a light beam steering mechanism in a star tracker or celestial aided inertial navigation unit.

13 Claims, 3 Drawing Sheets

RISLEY PRISM BASED STAR TRACKER AND CELESTIAL NAVIGATION SYSTEMS

STATEMENT REGARDING FEDERALLY SPONSORED RESEARCH OR DEVELOPMENT

This invention was made with Government support under a restricted contract number awarded by the Department of the Air Force—AFRL/RWK. The Government has certain rights in the invention.

BACKGROUND

Risley prisms are wedge-shaped glass prisms that enable variable beam deflection. Typically, Risley prisms are used as prism pairs in which one of the two prisms rotates to move from maximum to minimum beam deflection. Risley prisms are generally limited by lateral chromatic aberration, in which different wavelengths focus at the same image plane but at different transverse locations.

Typical star tracker and celestial navigation systems require large size, weight, and power (SWaP), and must be designed with very narrow field of view. There are also problems with beam steering mechanisms in such systems. For example, mechanical steering mechanisms typically add too much SWaP, and even then still may not achieve a required field of regard. Optical steering mechanisms in such systems typically introduce intolerable chromatic error or distortion.

SUMMARY

An optical system comprises a pair of Risley prisms positioned along an optical axis to receive a light beam from a field of view, wherein at least one of the Risley prisms is rotatable, transverse to the optical axis, with respect to the other of the Risley prisms. At least one lens is positioned along the optical axis to receive the light beam from the pair of Risley prisms, with the at least one lens configured to focus the light beam. An optical detector array is positioned along the optical axis at an image plane, wherein the optical detector array receives the focused light beam on the image plane from the at least one lens. The optical system can be implemented as a light beam steering mechanism in a star tracker or celestial aided inertial navigation unit.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A Risley prism based approach is disclosed herein for use as the light beam steering mechanism in a star tracker or celestial navigation system. The light beam steering by the Risley prisms can eliminate the need for mechanical slewing, and greatly reduces overall mechanical motion.

In one embodiment, a pair of Risley prisms is implemented in an optical layout that enables a field of view (FOV) shift within a field of regard (FOR) without large mechanical motion, by rotating at least one of the Risley prisms transverse to the optical axis. This provides shifting the FOV within a larger FOR over the course of a 180 degree prism rotation.

In another embodiment, two pairs of achromatic prisms are implemented in an optical layout, in which at least one pair of the achromatic prisms is rotatable with respect to the other pair of achromatic prisms. This configuration forms a Risley prism system.

The Risley prisms greatly reduce the amount of mechanical motion required to shift the FOV within the FOR. In this manner, the need for large mechanical motion and the associated bulky, power-hungry apparatus is eliminated, which results in a significant reduction in size, weight and power (SWaP) and cost, for star tracker or celestial aided inertial navigation systems.

In a further embodiment, a two-part light shade is implemented in the optical layout for Risley prism-based star trackers and celestial navigation units. The light shade utilizes the field angle shift induced by the rotatable Risley prisms to block light at both large and small field angles. In this way, the light shade enables a well-defined FOV to maximize signal noise reduction, enhance signal detection and integrity, and improve overall system performance.

Further details of the various embodiments are described hereafter with reference to the drawings.

Figure 1:
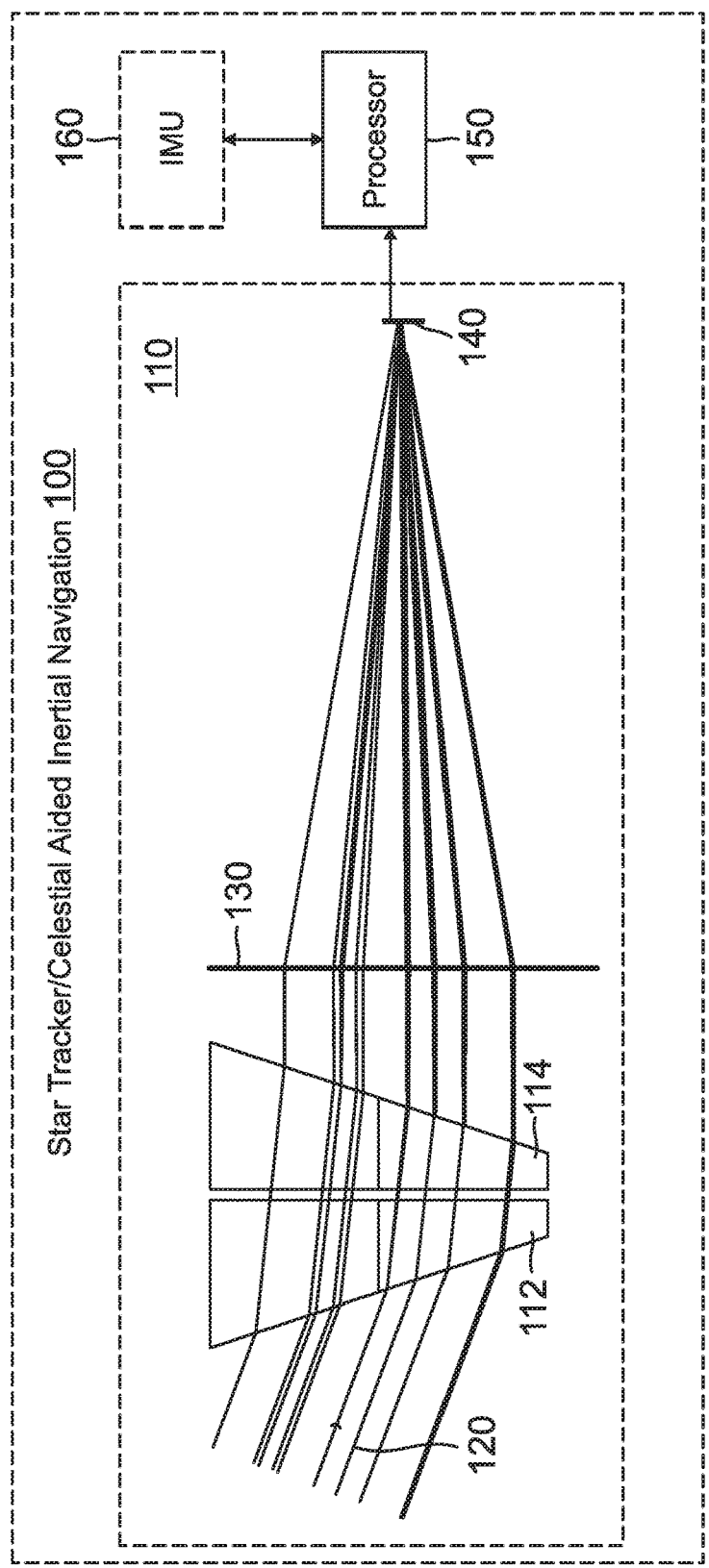
FIG. 1 is a block diagram of a system for a star tracker or a celestial aided inertial navigation unit, which includes an optical layout that is implemented as a light beam steering mechanism, according to one embodiment.

FIG. 1 generally illustrates a system 100 for a star tracker or a celestial aided inertial navigation unit, which includes an optical layout 110 that is implemented as a light beam steering mechanism according to one embodiment. The optical layout 110 includes a pair of Risley prisms 112, 114 positioned along an optical axis to receive a light beam 120 from a multi-chromatic collimated source, for example. In one embodiment, Risley prisms 112, 114 are a matched pair in which both prims are constructed of the same glass material. In addition, the Risley prisms 112, 114 are each rotatable, transverse to the optical axis, with respect to each other. This provides shifting the FOV within a larger FOR over the course of a 180 degree prism rotation. By rotating both prims, the entire FOR can be scanned.

At least one focusing lens 130, such as an objective lens, is positioned along the optical axis to image light beam 120 from the pair of Risley prisms 112, 114. An optical detector array 140 is positioned along the optical axis and at the image plane. The optical detector array 140 receives the focused light beam on the image plane from focusing lens 130. The optical detector array 140 is operatively connected to a processor 150, which processes signals received from optical detector array 140 for further use by system 100.

When system 100 is implemented for celestial aided inertial navigation, an inertial measurement unit (IMU) 160 is employed, which is in operative communication with processor 150. When system 100 is implemented for a star tracker, the IMU is not required.

Figure 2:
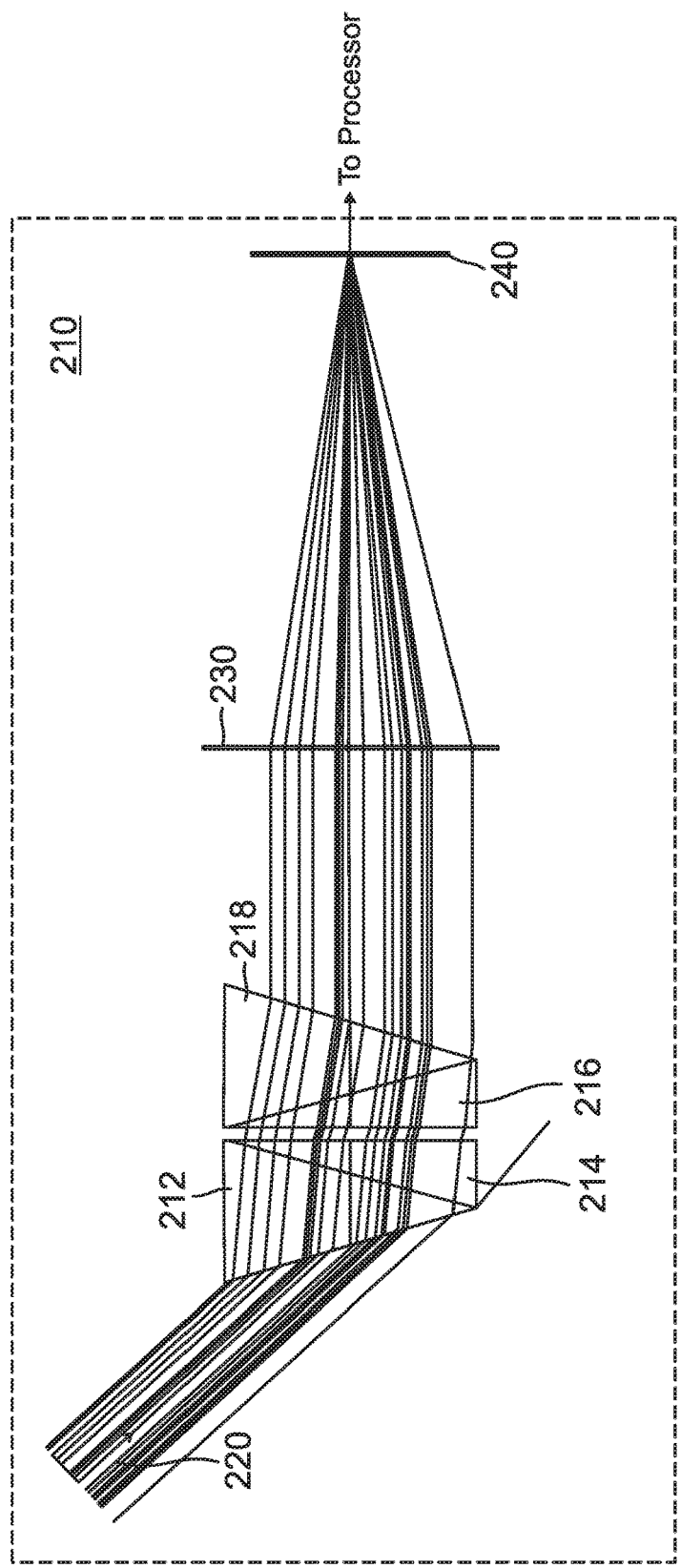
FIG. 2 depicts an optical layout that can be implemented as a light beam steering mechanism for the system of FIG. 1, according to another embodiment.

FIG. 2 illustrates an optical layout 210 that can be implemented as a light beam steering mechanism for system 100, according to another embodiment. The optical layout 210 includes a first pair of prisms 212, 214 and a second pair of prisms 216, 218, which are positioned along the optical axis to receive a light beam 220 from a multi-chromatic collimated source, for example. The first pair of prisms 212, 214 are each achromatic with respect one another, and the second pair of prisms 216, 218 are also each achromatic with respect to one another. The prisms in each pair are achromatic by being constructed of different glass materials, for example.

The first pair of prisms 212, 214 are each fixed with respect to one another, and the second pair of prisms 216, 218 are also each fixed with respect to one another. However, at least one of the pairs of prisms is rotatable, transverse to the optical axis, with respect to the other of the pairs of prisms, which produces a Risley prism system.

At least one focusing lens 230, such as a objective lens, is positioned along the optical axis to receive light beam 220 from the first and second pairs of prisms. An optical detector array 240 is positioned along the optical axis at the image plane for receiving the focused light beam from focusing lens 230. The optical detector array 240 can be operatively connected to a processor such as processor 150 (FIG. 1), which processes signals received from optical detector array 240 for further use by system 100.

Figure 3:
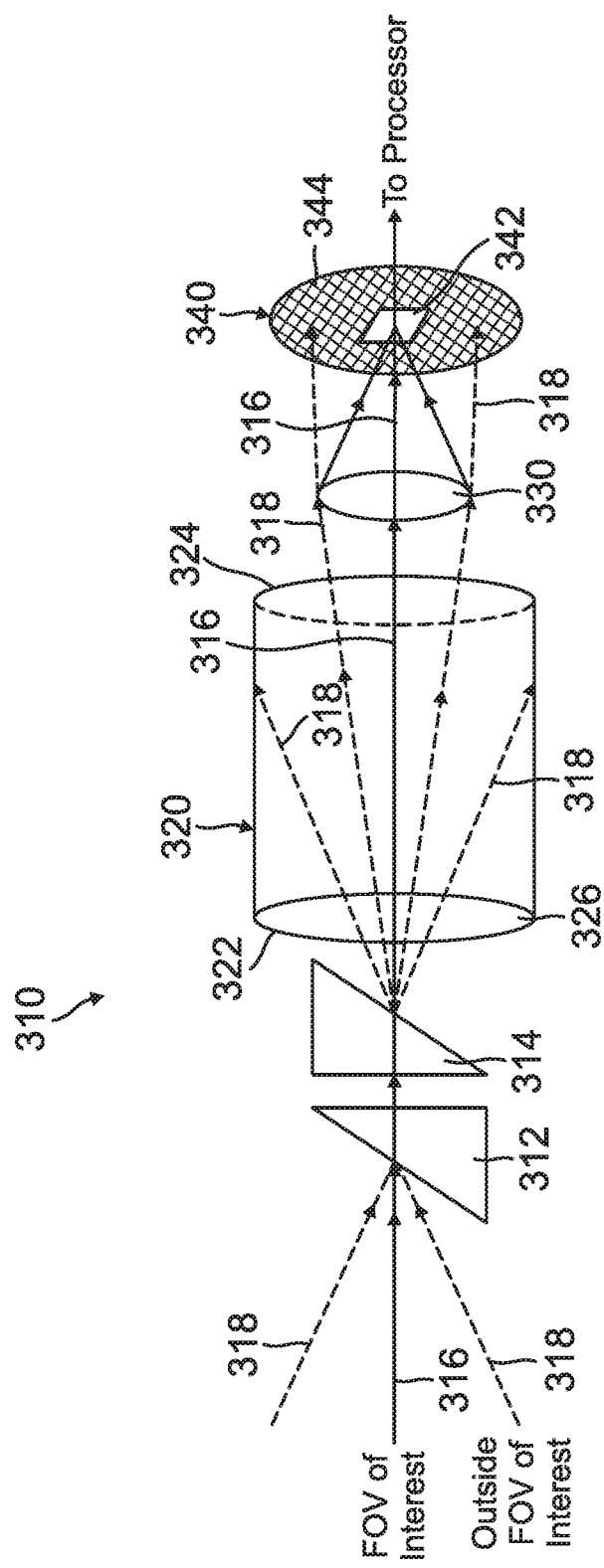
FIG. 3 schematically illustrates an optical system that can be implemented as a light beam steering mechanism for a star tracker or a celestial navigation unit, according to a further embodiment.

FIG. 3 illustrates an optical system 310 that can be implemented as a light beam steering mechanism for a star tracker or a celestial aided inertial navigation unit, according to a further embodiment. The optical system 310 includes at least one pair of prisms 312, 314 positioned along an optical axis to receive a light beam from a FOV, including at least one ray 316 from a FOV of interest and one or more rays 318 from outside the FOV of interest.

In one embodiment, the prisms 312, 314 are Risley prisms, in which at least one of the prisms is rotatable, transverse to the optical axis, with respect to the other of the prisms. The Risley prisms can be a matched pair in which both prisms are composed of the same glass material.

A light shade 320, having an input end 322 and an output end 324, is positioned along the optical axis and configured to receive, at input end 322, the light beam from prisms 312, 314. The light shade 320 includes a hollow interior defined by an inner surface 326, which is configured to block the one or more rays 318 that are from outside the FOV of interest and have larger field angles, as the light beam passes through light shade 320. The ray 316 that is from the FOV of interest passes through output end 324 of light shade 320. In one embodiment, light shade 320 has a cylindrical shape, and inner surface 326 has a plurality of light absorbing baffles.

At least one focusing lens 330, such as an objective lens, is positioned along the optical axis to receive, from output end 324 of light shade 320, the ray 316 that is from the FOV of interest, and any rays 318 that are from outside the FOV of interest that pass through light shade 320.

An optical detector device 340 is positioned along the optical axis, and includes an optical detector array 342 and a light blocker section 344 that surrounds optical detector array 342. The optical detector array 342 receives, from focusing lens 330, the ray 316 that is from the FOV of interest. Any rays 318 from outside the FOV of interest that pass through focusing lens 330 and have smaller field angles are blocked by light blocker section 344. In one embodiment, light blocker section 344 has a disc shape and is covered with a coating that absorbs light energy. The optical detector array 342 can be operatively connected to a processor, which processes signals received from optical detector array 342 for further use by the star tracker or celestial aided inertial navigation unit.

In an alternative embodiment, two pairs of achromatic prisms can be implemented in place of the one pair of Risley prisms along the optical axis in optical system 310. For example, the achromatic prisms 212, 214 and the achromatic prisms 216, 218 (FIG. 2) can be implemented near input end 322 of light shade 320 along the optical axis for optical system 310.

EXAMPLE EMBODIMENTS

Example 1 includes an optical system, comprising: a pair of Risley prisms positioned along an optical axis to receive a light beam from a field of view, wherein at least one of the Risley prisms is rotatable, transverse to the optical axis, with respect to the other of the Risley prisms; at least one lens positioned along the optical axis to receive the light beam from the pair of Risley prisms, the at least one lens configured to focus the light beam; and an optical detector array positioned along the optical axis at an image plane, wherein the optical detector array receives the focused light beam on the image plane from the at least one lens; wherein the optical system is implemented as a light beam steering mechanism in a star tracker or celestial aided inertial navigation unit.

Example 2 includes the optical system of Example 1, wherein the Risley prisms are each composed of the same glass material.

Example 3 includes the optical system of any of Examples 1-2, wherein the at least one lens comprises an objective lens.

Example 4 includes an optical system, comprising: a first pair of achromatic prisms positioned along an optical axis to receive a light beam from a field of view; a second pair of achromatic prisms positioned along the optical axis to receive the light beam from the first pair of achromatic prisms; at least one lens positioned along the optical axis to receive the light beam from the second pair of achromatic prisms, the at least one lens configured to focus the light beam; and an optical detector array positioned along the optical axis at an image plane, wherein the optical detector array receives the focused light beam on the image plane from the at least one lens; wherein at least one pair of the achromatic prisms is rotatable, transverse to the optical axis, with respect to the other pair of the achromatic prisms; wherein the optical system is implemented as a light beam steering mechanism in a star tracker or celestial aided inertial navigation unit.

Example 5 includes the optical system of Example 4, wherein the achromatic prisms in each pair are composed of different glass materials.

Example 6 includes the optical system of any of Examples 4-5, wherein the at least one lens comprises an objective lens.

Example 7 includes the optical system of any of Examples 4-6, wherein the achromatic prisms in the first pair are fixed with respect to each other; and the achromatic prisms in the second pair are fixed with respect to each other.

Example 8 includes an optical system, comprising: a first pair of prisms positioned along an optical axis to receive a light beam from a field of view (FOV); a light shade having an input end and an output end, the light shade positioned along the optical axis and configured to receive, at the input end, the light beam from the first pair of prisms, the light shade including a hollow interior defined by an inner surface that is configured to block one or more rays of the light beam that are from outside of an FOV of interest as the light beam passes through the light shade, wherein at least one ray of the light beam that is from the FOV of interest passes through the output end of the light shade; at least one lens positioned along the optical axis to receive, from the output end of the light shade, the at least one ray of the light beam that is from the FOV of interest, and any rays of the light beam that are from outside of the FOV of interest that pass through the light shade; and an optical detector device positioned along the optical axis, the optical detector device including an optical detector array and a light blocker section that surrounds the optical detector array, wherein the optical detector array receives, from the at least one lens, the at least one ray of the light beam that is from the FOV of interest, wherein any rays of the light beam that are from outside the FOV of interest that pass through the at least one lens are blocked by the light blocker section.

Example 9 includes the optical system of Example 8, wherein the first pair of prisms comprise Risley prisms, such that at least one of the prisms is rotatable, transverse to the optical axis, with respect to the other of the prisms.

Example 10 includes the optical system of Example 9, wherein the Risley prisms are each composed of the same glass material.

Example 11 includes the optical system of Example 8, further comprising a second pair of prisms near the first pair of prisms and the input end of the light shade along the optical axis, wherein at least one pair of the prisms is rotatable, transverse to the optical axis, with respect to the other pair of the prisms.

Example 12 includes the optical system of Example 11, wherein the first pair of prisms are achromatic with respect to each other; and the second pair of prisms are achromatic with respect to each other.

Example 13 includes the optical system of Example 12, wherein the first pair of prims are fixed with respect to each other; and the second pair of prisms are fixed with respect to each other.

Example 14 includes the optical system of any of Examples 8-13, wherein the light shade has a cylindrical shape.

Example 15 includes the optical system of Example 14, wherein the inner surface of the light shade has plurality of light absorbing baffles.

Example 16 includes the optical system of any of Examples 8-15, wherein the light blocker section of the optical detector device has a disc shape.

Example 17 includes the optical system of any of Examples 8-16, wherein the light blocker section is covered with a coating that absorbs light energy.

Example 18 includes the optical system of any of Examples 8-17, wherein the light shade is configured to block rays of the light beam from outside the FOV of interest that have larger field angles.

Example 19 includes the optical system of Example 18, wherein the light blocker section of the optical detector device is configured to block rays of the light beam from outside the FOV of interest that have smaller field angles.

Example 20 includes the optical system of any of Examples 8-19, wherein the optical system is implemented as a light beam steering mechanism in a star tracker or celestial aided inertial navigation unit.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An optical system, comprising:
a first pair of prisms positioned along an optical axis to receive a light beam from a field of view (FOV);
a light shade having an input end and an output end, the light shade positioned along the optical axis and configured to receive, at the input end, the light beam from the first pair of prisms, the light shade including a hollow interior defined by an inner surface that is configured to block one or more rays of the light beam that are from outside of an FOV of interest as the light beam passes through the light shade, wherein at least one ray of the light beam that is from the FOV of interest passes through the output end of the light shade;
at least one lens positioned along the optical axis to receive, from the output end of the light shade, the at least one ray of the light beam that is from the FOV of interest, and any rays of the light beam that are from outside of the FOV of interest that pass through the light shade; and
an optical detector device positioned along the optical axis, the optical detector device including an optical detector array and a light blocker section that surrounds the optical detector array, wherein the optical detector array receives, from the at least one lens, the at least one ray of the light beam that is from the FOV of interest, wherein any rays of the light beam that are from outside the FOV of interest that pass through the at least one lens are blocked by the light blocker section.

2. The optical system of claim 1, wherein the first pair of prisms comprise Risley prisms, such that at least one of the prisms is rotatable, transverse to the optical axis, with respect to the other of the prisms.

3. The optical system of claim 2, wherein the Risley prisms are each composed of the same glass material.

4. The optical system of claim 1, further comprising a second pair of prisms near the first pair of prisms and the input end of the light shade along the optical axis, wherein at least one pair of the prisms is rotatable, transverse to the optical axis, with respect to the other pair of the prisms.

5. The optical system of claim 4, wherein:
the first pair of prisms are achromatic with respect to each other; and
the second pair of prisms are achromatic with respect to each other.

6. The optical system of claim 5, wherein:
the first pair of prims are fixed with respect to each other; and
the second pair of prisms are fixed with respect to each other.

7. The optical system of claim 1, wherein the light shade has a cylindrical shape.

8. The optical system of claim 7, wherein the inner surface of the light shade has plurality of light absorbing baffles.

9. The optical system of claim 1, wherein the light blocker section of the optical detector device has a disc shape.

10. The optical system of claim 1, wherein the light blocker section is covered with a coating that absorbs light energy.

11. The optical system of claim 1, wherein the light shade is configured to block rays of the light beam from outside the FOV of interest that have larger field angles.

12. The optical system of claim 11, wherein the light blocker section of the optical detector device is configured to block rays of the light beam from outside the FOV of interest that have smaller field angles.

13. The optical system of claim 1, wherein the optical system is implemented as a light beam steering mechanism in a star tracker or celestial aided inertial navigation unit.

* * * * *